(12) United States Patent
Yamanaka et al.

(10) Patent No.: US 7,856,903 B2
(45) Date of Patent: *Dec. 28, 2010

(54) BICYCLE CRANK AXLE WITH A RADIAL PROJECTION

(75) Inventors: Masahiro Yamanaka, Izumisano (JP); Etsuyoshi Watarai, Izumi (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 1041 days.

This patent is subject to a terminal disclaimer.

(21) Appl. No.: 11/613,130

(22) Filed: Dec. 19, 2006

(65) Prior Publication Data

US 2007/0137428 A1 Jun. 21, 2007

Related U.S. Application Data

(60) Continuation-in-part of application No. 10/676,417, filed on Sep. 30, 2003, now Pat. No. 7,234,373, which is a division of application No. 10/095,262, filed on Mar. 8, 2002, now Pat. No. 6,755,095, which is a continuation-in-part of application No. 10/002,256, filed on Nov. 23, 2001, now Pat. No. 6,988,427.

(51) Int. Cl.
*B62M 3/00* (2006.01)
(52) U.S. Cl. .................................... 74/594.1; 74/594.2
(58) Field of Classification Search ..... 74/594.1–594.3; 384/484–486, 489, 545; 280/259; 180/260; 188/266
See application file for complete search history.

(56) References Cited

U.S. PATENT DOCUMENTS

| | | | |
|---|---|---|---|
| 510,620 | A | 12/1893 | Smith |
| 622,644 | A | 4/1899 | Annable |
| 626,227 | A | 6/1899 | Gaylor |
| 648,077 | A | 4/1900 | Ludlow |

(Continued)

FOREIGN PATENT DOCUMENTS

DE 3531030 A1 3/1987

(Continued)

OTHER PUBLICATIONS

European Search Report for EP 07010981.4, the European application that corresponds to this application, dated Jul. 2, 2007.

*Primary Examiner*—Vinh T. Luong
(74) *Attorney, Agent, or Firm*—James A. Deland

(57) ABSTRACT

A bicycle crank axle comprises an axle body having first and second end portions, a plurality of first splines disposed at the first end portion of the axle body, a plurality of second splines disposed at the second end portion of the axle body, and a projection extending radially outwardly from the first end portion of the axle body, wherein the projection is structured to abut against a lateral outer surface of a bicycle crank arm to prevent the bicycle crank arm from moving axially outward. A separate projecting member is mounted to the first end of the axle body to form the projection. The plurality of first splines extend radially outwardly from an outer peripheral surface of the axle body for engaging a splined surface of the bicycle crank arm, but the plurality of second splines do not extend radially outwardly relative to the outer peripheral surface of the axle body.

12 Claims, 10 Drawing Sheets

U.S. PATENT DOCUMENTS

| | | |
|---|---|---|
| 1,389,997 A | 9/1921 | Sedgwick |
| 2,083,092 A | 1/1936 | Richer |
| 3,529,508 A | 9/1970 | Cooksey |
| 3,578,829 A | 5/1971 | Hata |
| 4,300,411 A | 11/1981 | Segawa |
| 4,331,043 A | 5/1982 | Shimano |
| 4,358,967 A | 11/1982 | Kastan |
| 4,371,176 A | 2/1983 | Shimano |
| 4,418,584 A | 12/1983 | Shimano |
| 4,522,610 A | 6/1985 | Nagano |
| 4,545,691 A | 10/1985 | Kastan et al. |
| 4,606,658 A | 8/1986 | Hoffmann et al. |
| 4,618,299 A | 10/1986 | Bainbridge et al. |
| 4,704,919 A | 11/1987 | Durham |
| 4,728,218 A | 3/1988 | Durham |
| 5,010,785 A | 4/1991 | Romero |
| 5,118,205 A | 6/1992 | Hoffmann |
| 5,207,132 A | 5/1993 | Goss et al. |
| 5,209,581 A | 5/1993 | Nagano |
| 5,233,885 A * | 8/1993 | Lin et al. .................... 74/594.1 |
| 5,370,486 A | 12/1994 | Plummer |
| 5,476,327 A | 12/1995 | Chiang |
| 5,493,937 A | 2/1996 | Edwards |
| 5,494,390 A | 2/1996 | Gonzales |
| 5,496,114 A | 3/1996 | Lin |
| 5,509,739 A | 4/1996 | Chi |
| 5,531,510 A | 7/1996 | Yamane |
| 5,549,396 A | 8/1996 | Chiang |
| 5,572,909 A | 11/1996 | Chi |
| 5,575,540 A | 11/1996 | Chi |
| 5,762,426 A | 6/1998 | Lin |
| 5,791,203 A | 8/1998 | Chen et al. |
| 5,819,599 A | 10/1998 | Yamanaka |
| 5,845,543 A | 12/1998 | Yamanaka |
| 5,852,954 A | 12/1998 | Yamanaka |
| 5,907,980 A | 6/1999 | Yamanaka |
| 5,909,931 A | 6/1999 | Tabe |
| 5,919,106 A | 7/1999 | Ichida |
| 5,980,116 A | 11/1999 | Chiang |
| 6,003,889 A * | 12/1999 | Shalom ...................... 280/259 |
| 6,095,691 A | 8/2000 | Chiang |
| 6,139,192 A | 10/2000 | Chiang |
| 6,164,157 A | 12/2000 | Chen |
| 6,199,449 B1 | 3/2001 | Harrington |
| 6,276,234 B1 | 8/2001 | Harrington |
| 6,463,828 B1 * | 10/2002 | Soucek ...................... 74/594.1 |
| 6,478,128 B2 | 11/2002 | Taylor |
| 6,860,171 B1 | 3/2005 | Nanko et al. |
| 7,607,507 B2 * | 10/2009 | Lane et al. .................. 180/260 |
| 2001/0049976 A1 * | 12/2001 | Dodman ..................... 74/594.1 |
| 2004/0200314 A1 | 10/2004 | Hermansen et al. |
| 2006/0103106 A1 | 5/2006 | Schlanger |
| 2009/0152059 A1 * | 6/2009 | Womack et al. ............. 188/266 |

FOREIGN PATENT DOCUMENTS

| | | |
|---|---|---|
| DE | 19751879 A1 | 5/1999 |
| DE | 19954432 A1 | 5/2001 |
| EP | 0485954 A1 | 11/1990 |
| EP | 0512149 A1 | 5/1991 |
| EP | 0513647 A1 | 11/1992 |
| EP | 0756991 A2 | 2/1997 |
| EP | 1352825 A1 | 10/2003 |
| EP | 1426282 A2 | 6/2004 |
| EP | 1493654 A1 | 1/2005 |
| EP | 1759981 A2 | 3/2007 |
| FR | 904975 A | 11/1945 |
| FR | 946276 A | 5/1949 |
| FR | 1001909 A | 2/1952 |
| FR | 1309208 | 4/1963 |
| FR | 2501615 A1 | 9/1982 |
| GB | 267796 A | 3/1927 |
| GB | 356497 A | 9/1931 |
| GB | 549498 A | 11/1942 |
| GB | 1002089 A | 2/1979 |
| JP | 63-133488 U | 8/1988 |
| JP | 05-250056 A | 9/1993 |

* cited by examiner

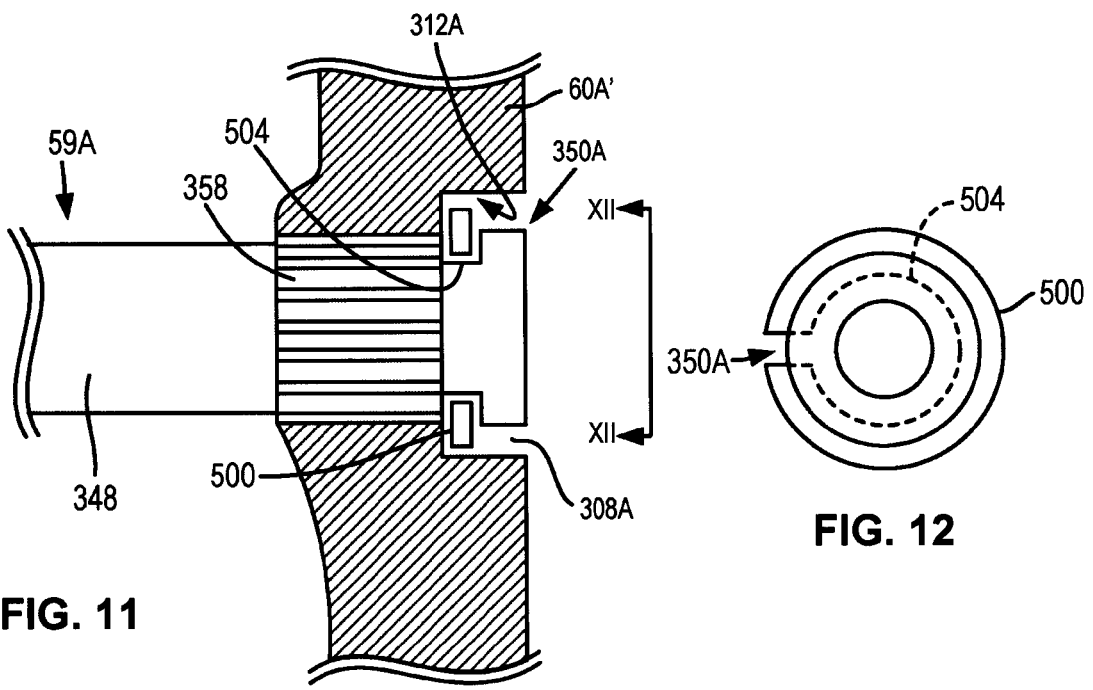
FIG. 11
FIG. 12
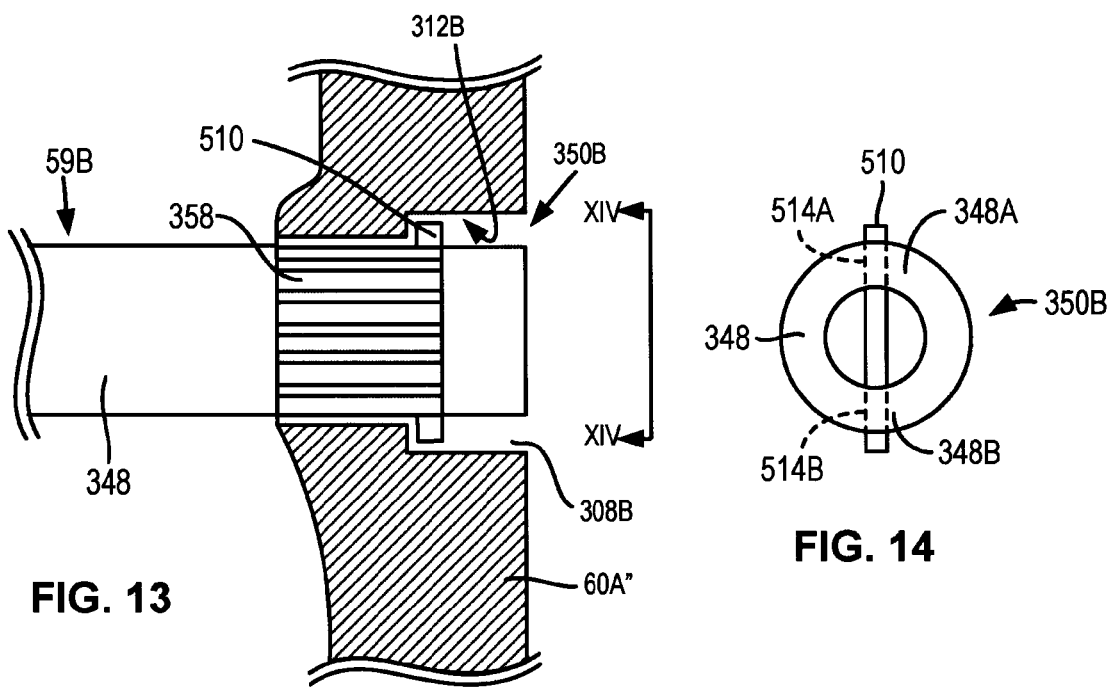
FIG. 13
FIG. 14

BICYCLE CRANK AXLE WITH A RADIAL PROJECTION

CROSS REFERENCE TO RELATED APPLICATIONS

This application is a continuation-in-part of copending U.S. patent application Ser. No. 10/676,417, which is a division of U.S. patent application Ser. No. 10/095,262, now U.S. Pat. No. 6,755,095, which is a continuation-in-part of U.S. patent application Ser. No. 10/002,256, now U.S. Pat. No. 6,988,427.

BACKGROUND OF THE INVENTION

The present invention is directed to bicycles and, more particularly, to a bicycle crank axle.

A bicycle bottom bracket is a cylindrical tube portion of the bicycle frame used to rotatably mount a pedal assembly to the bicycle. The pedal assembly usually comprises right and left crank arms, each of which has a pedal attached to one end. The other end of each crank arm is attached to an axle that extends through the bottom bracket. A bearing assembly is disposed between the axle and the bottom bracket at each side of the bottom bracket for rotatably supporting the axle, and one or more front sprockets usually are attached to the right side crank arm for driving the bicycle chain.

SUMMARY OF THE INVENTION

The present invention is directed to a bicycle crank axle. The crank axle comprises an axle body having first and second end portions, a plurality of first splines disposed at the first end portion of the axle body, a plurality of second splines disposed at the second end portion of the axle body, and a projection extending radially outwardly from the first end portion of the axle body, wherein the projection is structured to abut against a lateral outer surface of a bicycle crank arm to prevent the bicycle crank arm from moving axially outward. A separate projecting member is mounted to the first end of the axle body to form the projection. The plurality of first splines extend radially outwardly from an outer peripheral surface of the axle body for engaging a splined surface of the bicycle crank arm, but the plurality of second splines do not extend radially outwardly relative to the outer peripheral surface of the axle body. Additional inventive features will become apparent from the description below, and such features alone or in combination with the above features may form the basis of further inventions as recited in the claims and their equivalents.

BRIEF DESCRIPTION OF THE DRAWINGS

FIG. 11 is detailed view of an alternative embodiment of components located at the first portion of the crank axle;

FIG. 12 is a view taken along line XII-XII in FIG. 11;

FIG. 13 is detailed view of another alternative embodiment of components located at the first portion of the crank axle; and FIG. 14 is a view taken along line XIV-XIV in FIG. 13.

DETAILED DESCRIPTION OF THE EMBODIMENTS

Figure 1:
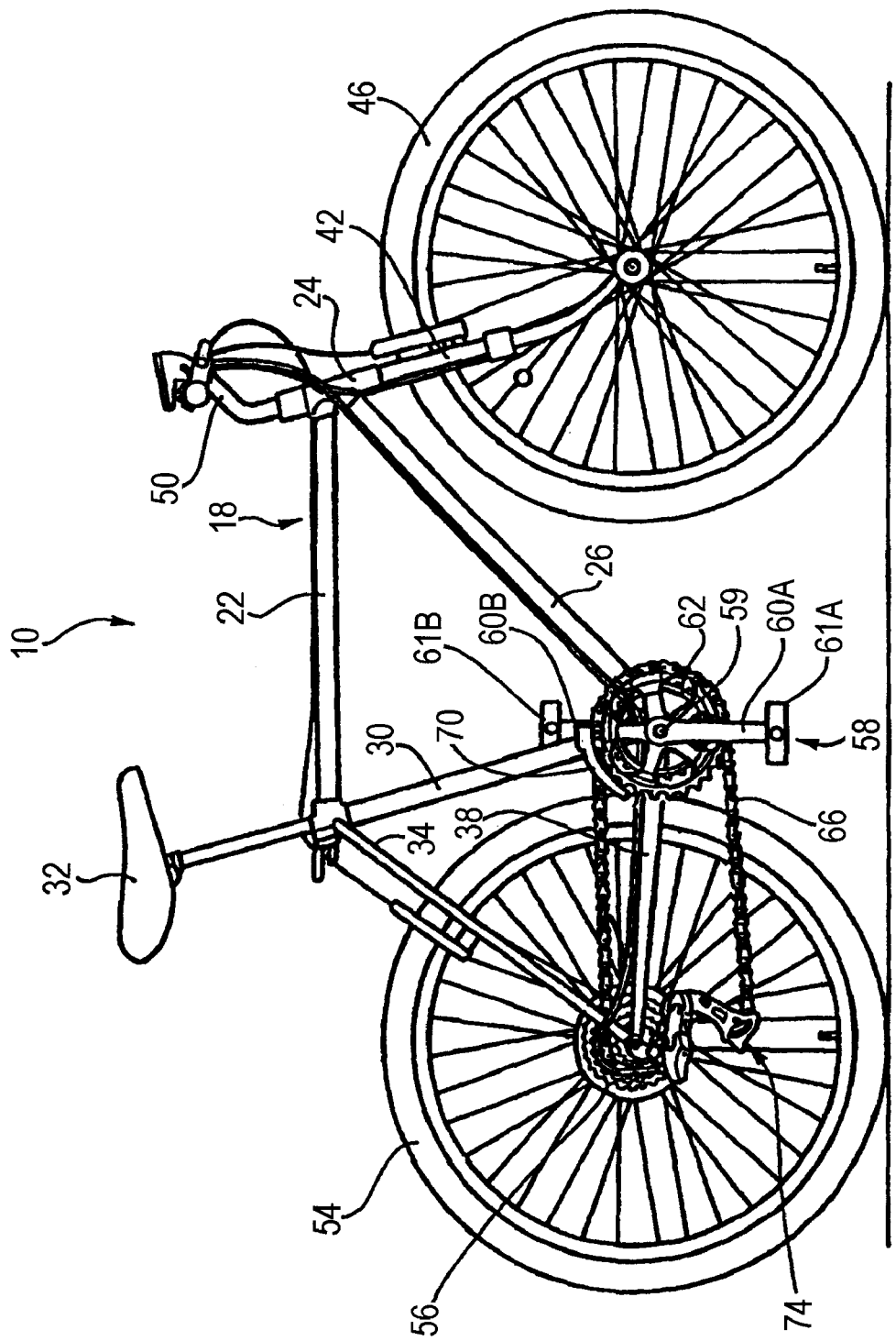
FIG. 1 is a side view of a bicycle that includes a particular embodiment of a crank assembly according to the present invention.

FIG. 1 is a side view of a bicycle 10 that incorporates a particular embodiment of a crank assembly according to the present invention. Bicycle 10 may be any type of bicycle, and in this embodiment bicycle 10 includes a typical frame 18 comprising a top tube 22, a head tube 24, a down tube 26 extending downwardly from head tube 24, a seat tube 30 supporting a seat 32 and extending downwardly from top tube 22, a bottom bracket 33 (FIG. 3) disposed at the junction of down tube 26 and seat tube 30, a pair of seatstays 34 extending rearwardly and downwardly from top tube 22, and a pair of chainstays 38 extending rearwardly from bottom bracket 33. A fork 42 is rotatably supported within head tube 24, and a front wheel 46 is rotatably supported to the lower end of fork 42. Handlebars 50 control the rotational direction of fork 42 and front wheel 46 in a well-known manner. A rear wheel 54 having a plurality of coaxially mounted rear (freewheel) sprockets 56 is rotatably supported at the junction of seatstays 34 and chainstays 38, and a pedal assembly 58 supporting a plurality of front (chainwheel) sprockets 62 is rotatably supported within bottom bracket 33. Pedal assembly 58 includes an axle 59, a right side crank arm 60A attached to the right end of axle 59, a left side crank arm 60B attached to the left end of axle 59, and pedals 61A and 61B rotatably attached to the ends of crank arms 60A and 60B, respectively. Typically, two or three front sprockets 62 rotate coaxially and integrally with right side crank arm 60A. A chain 66 engages one of the plurality of front sprockets 62 and one of the plurality of rear sprockets 56. A front derailleur 70 moves chain 66 from one front sprocket 62 to another, and a rear derailleur 74 moves chain 66 from one rear sprocket 56 to another in accordance with shift commands from a rider in a known manner.

Figure 2:
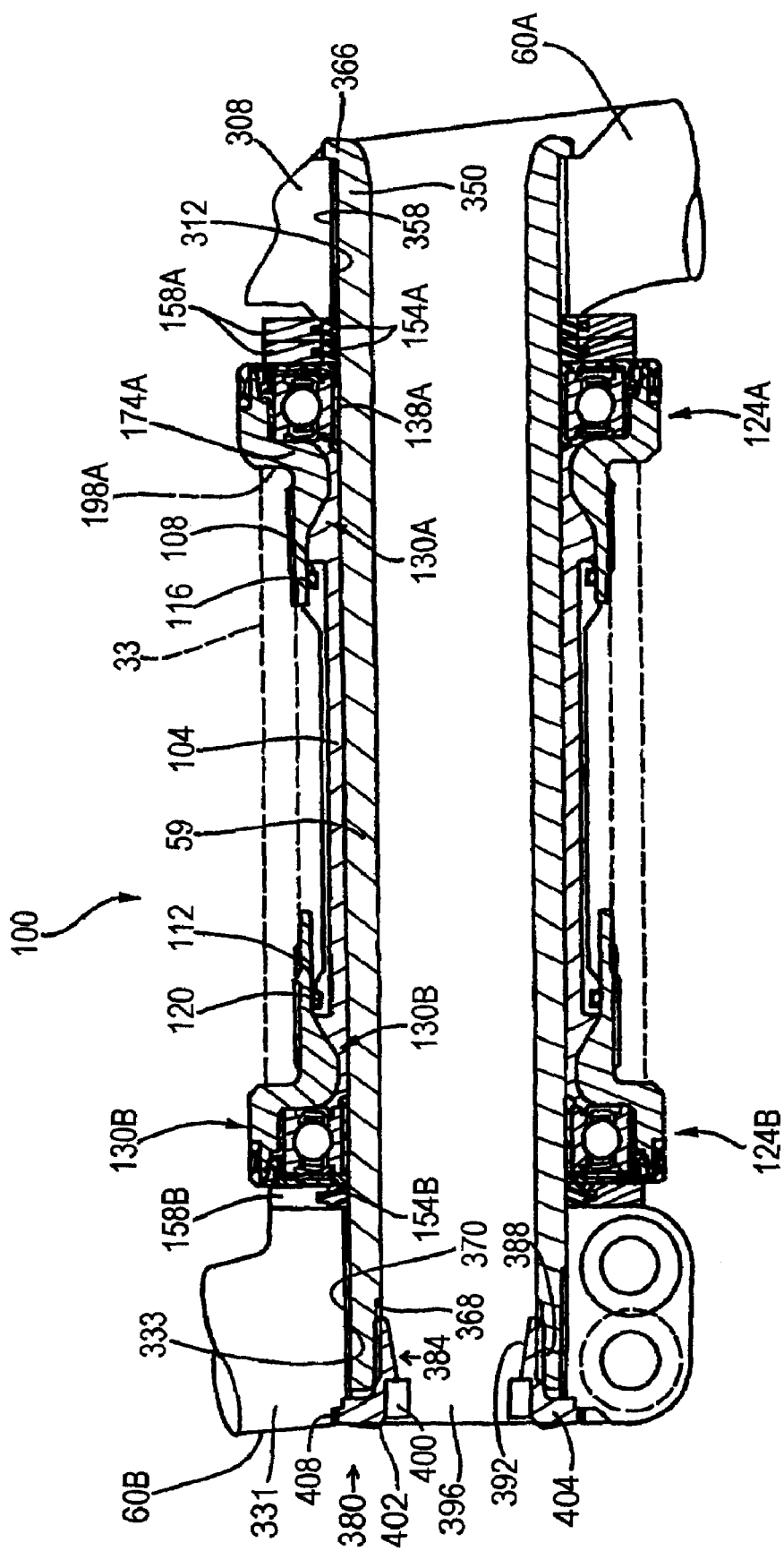
FIG. 2 is a rear cross-sectional view of a particular embodiment of a crank assembly according to the present invention.
Figure 3:
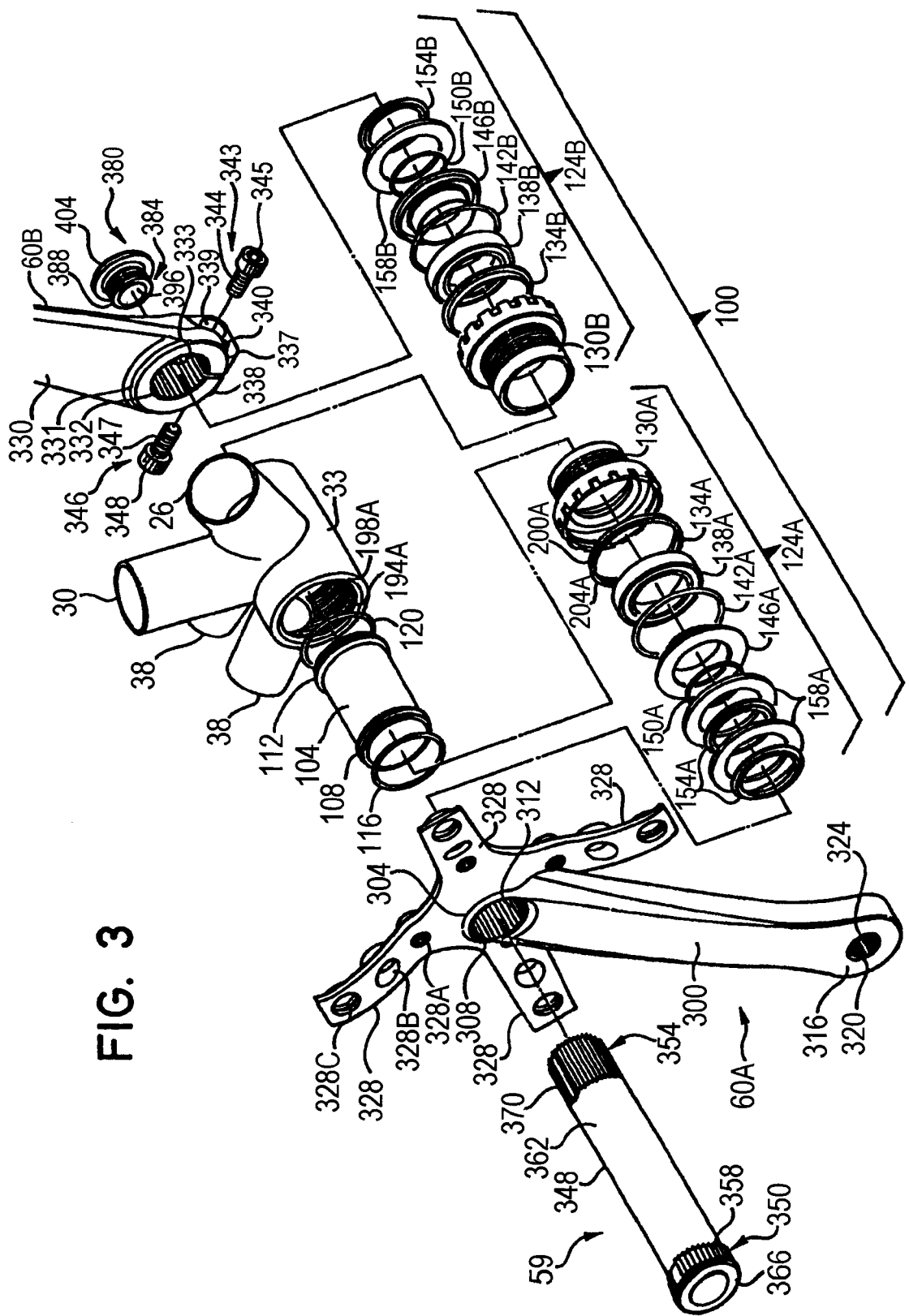
FIG. 3 is an exploded view of the crank assembly shown in FIG. 2.

FIG. 2 is a rear cross-sectional view of a particular embodiment of a bottom bracket assembly 100 according to the present invention, and FIG. 3 is an exploded view of bottom bracket assembly 100. As shown in those figures, bottom bracket assembly 100 comprises bottom bracket 33, a dust tube 104 disposed within bottom bracket 33, wherein dust tube 104 includes annular grooves 108 and 112 at the opposite ends thereof, O-ring seals 116 and 120 fitted within annular grooves 108 and 112, respectively, and adapter assemblies 124A and 124B fitted to the ends of bottom bracket 33 and dust tube 104. Adapter assemblies 124A and 124B are used in part to position axle 59 laterally within bottom bracket 33 so that front sprockets 62 are properly aligned with rear sprockets 56. Such positioning allows front and rear derailleurs 70 and 74 to operate chain 66 in a satisfactory manner.

Figure 4:
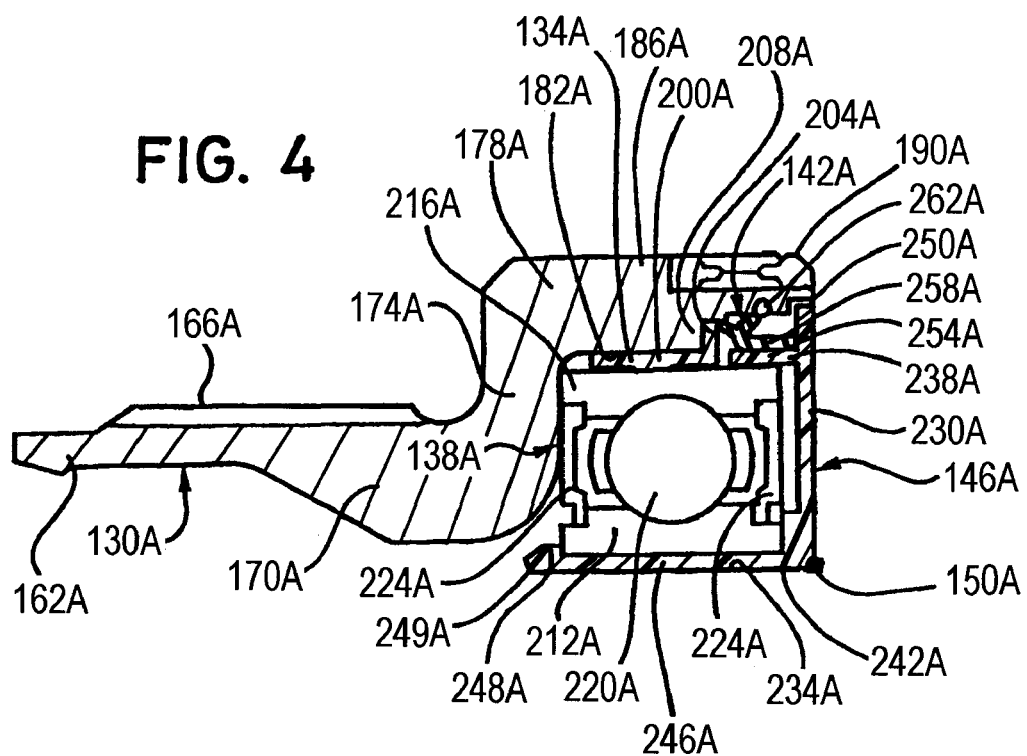
FIG. 4 is a more detailed view of the crank assembly shown in FIG. 2.

As shown more clearly in FIGS. 3 and 4, in this embodiment adapter assembly 124A comprises an adapter member 130A, a bearing ring 134A, a bearing unit 138A, a seal ring 142A, a seal guard 146A, an O-ring 150A, two ring-shaped spacers 154A, and two soft urethane ring-shaped spacer covers 158A that fit around the outer peripheral surfaces of spacers 154A as shown in FIG. 2. Similarly, as shown in FIG. 3, adapter assembly 124B comprises an adapter member 130B, a bushing in the form of a bearing ring 134B, a bearing unit 138B, a seal ring 142B, a seal guard 146B, an O-ring 150B, one ring-shaped spacer 154B, and a soft urethane ring-shaped spacer cover 158B that fits around the outer peripheral surface of spacers 154B. Spacers 154A and 154B help to set the lateral position of axle 59 as shown in FIG. 2. In this embodiment there are two spacers 154A on the right side of bottom bracket assembly 100 and only one spacer 154B on the left side of bottom bracket assembly 100. Thus, axle 59, crank arms 60A and 60B and sprockets 62 are shifted slightly to the right relative to bottom bracket 33.

Adapter assemblies 124A and 124B are constructed the same except for the number of spacers, and they operate in the same manner, so only the details of the components of adapter assembly 124A will be described in detail. As shown more clearly in FIG. 4, adapter member 130A comprises a smaller diameter tubular portion 162A having a threaded outer peripheral surface 166A and a thickened inner portion 170A, a radially outwardly extending side wall 174A, and a larger diameter portion 178A having an inner peripheral surface 182A and an outer peripheral surface 186A forming a tool engaging surface 190A. When adapter assembly 124A is in the assembled state, threaded outer peripheral surface 166A of smaller diameter portion 162A completely screws into a threaded inner peripheral surface 194A (FIG. 3) of bottom bracket 33 until side wall 174A of adapter member 130A abuts against a side edge 198A of bottom bracket 33 as shown in FIG. 2. Thus, in this embodiment there are no exposed portions of threaded outer peripheral surface 166A.

Bearing ring 134A comprises a tubular portion 200A and a radially outwardly extending side wall 204A. When adapter assembly 124A is in the assembled state, bearing ring 134A contacts inner peripheral surface 182A of larger diameter portion 178A of adapter member 130A, and side wall 204A abuts against an abutment 208A formed on inner peripheral surface 182A. In this embodiment, bearing ring 134A is formed of a nonmetallic material such as POM plastic.

In this embodiment, bearing unit 138A is a conventional sealed bearing unit comprising an inner bearing race 212A, an outer bearing race 216A, a plurality of ball bearings 220A disposed between inner bearing race 212A and outer bearing race 216A, and annular side covers 224A. When adapter assembly 124A is in the assembled state, outer race 216A contacts bearing ring 134A. Since bearing ring 134A is formed of a nonmetallic material, squeaking and other undesirable noises caused by the contact between these two components are minimized or eliminated. Of course, bearing ring 134A could be formed of any material that suits the application or for cost reasons.

Seal guard 146A functions as a support for seal ring 142A and O-ring 150A, and it comprises an annular base member 230A, an inner tubular member 234A and an outer tubular member 238A. In this embodiment, seal guard 146A is formed of a nonmetallic material such as POM plastic. Inner tubular member 234A extends from a radially inner side surface of base member 230A and, in this embodiment, extends from a radially innermost edge 242A of base member 230A to form a radially inner peripheral surface or inner ledge 246A. When adapter assembly 124A is in the assembled state, inner ledge 246A contacts and supports inner bearing race 212A of bearing unit 138A. A protuberance 248A extends radially outwardly (approx. 0.1 mm in this embodiment) from a free edge 249A of inner tubular member 234A to lock bearing unit 138A in position on inner tubular member 234A. Since seal guard 146A is formed of a nonmetallic material, squeaking and other undesirable noises caused by the contact between these two components are minimized or eliminated. Of course, seal guard 146A could be formed of any material that suits the application or for cost reasons.

Outer tubular member 238A extends from a radially outer side surface of base member 230A and, in this embodiment, is spaced apart from a radially outermost edge 250A of base member 230A to form a radially outer peripheral surface or outer ledge 254A. When adapter assembly 124A is in the assembled state, outer ledge 254A contacts and supports seal ring 142A and outer bearing race 216A of bearing unit 138A. Thus, bearing unit 138A is sandwiched between inner ledge 246A and outer ledge 254A. While inner tubular member 234A and outer tubular member 238A extend from the same side of base member 230A in this embodiment, it is not necessary for them to do so.

In this embodiment, seal ring 142A functions as an outer seal, and it is a generally L-shaped ring member having a base portion 258A and a radially outwardly extending lip portion 262A that forms an acute angle with base portion 258A. Base portion 258A contacts and is supported by outer ledge 254A, and lip portion 262A contacts inner peripheral surface 128A of adapter member 130A. Of course, seal ring 142A may take many different forms, and there need not be direct contact between the components. O-ring 150A functions as an inner seal, and it is disposed at radially inner edge 242A of base member 230A opposite inner tubular member 234A. When adapter assembly 124A is in the assembled state, O-ring 150A contacts axle 59. Seal ring 142A and O-ring 150A in combination prevent contaminants from entering the space containing bearing unit 138A more advantageously than prior art sealing structures.

Figure 5:
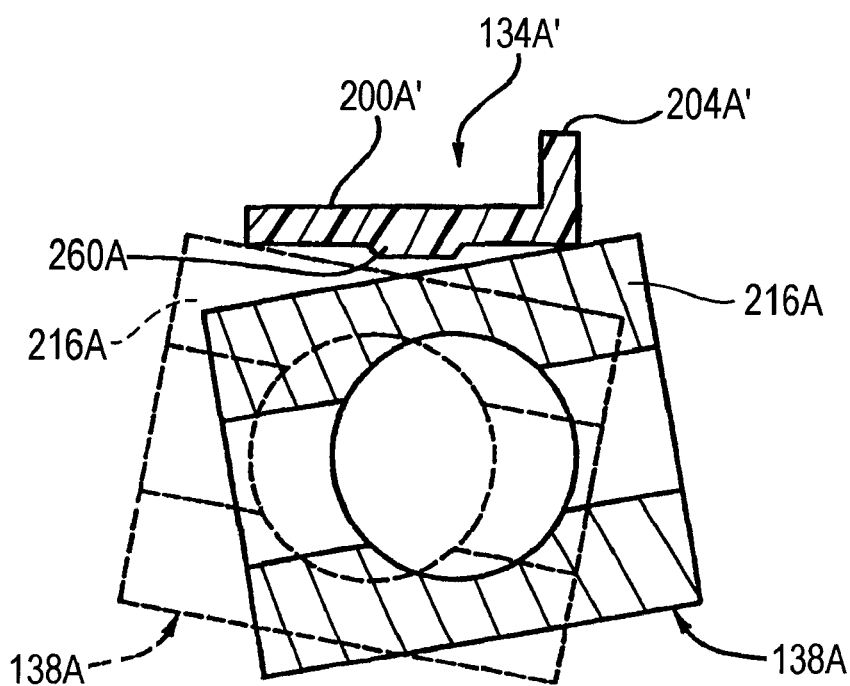
FIG. 5 is a cross sectional view of an alternative embodiment of the bushing shown in FIG. 4.

FIG. 5 is a detailed cross sectional view of a bearing ring 134A' that represents an alternative embodiment of bearing ring 134A shown in FIG. 4. As with bearing ring 134A, bearing ring 134A' comprises a tubular portion 200A' and a radially outwardly extending side wall 204A'. However, in this embodiment a centrally disposed bushing protuberance 260A extends radially inwardly from tubular portion 200A' for contacting outer bearing race 216A when adapter assembly 124A is in the assembled state. If bearing unit 138A is tilted for some reason as shown by the broken lines in FIG. 5, such as if bottom bracket 33 is bent as a result of a manufacturing defect or a collision, then bushing protuberance 260A accommodates such tilting. Although bushing protuberance 260A has a trapezoidal shape in this embodiment, it could have a spherical or other shape to perform the same function As shown in FIG. 3, right side crank arm 60A comprises a crank arm body 300, an axle mounting boss 304 having an axle mounting opening 308 with a splined inner peripheral surface 312, a pedal mounting boss 316 having a pedal mounting opening 320 with a threaded inner peripheral surface 324, and four sprocket mounting arms 328 extending radially outwardly from axle mounting boss 304. In this embodiment, each sprocket mounting arm 328 has three sprocket mounting openings 328A, 328B and 328C for mounting three front sprockets.

Figure 6:
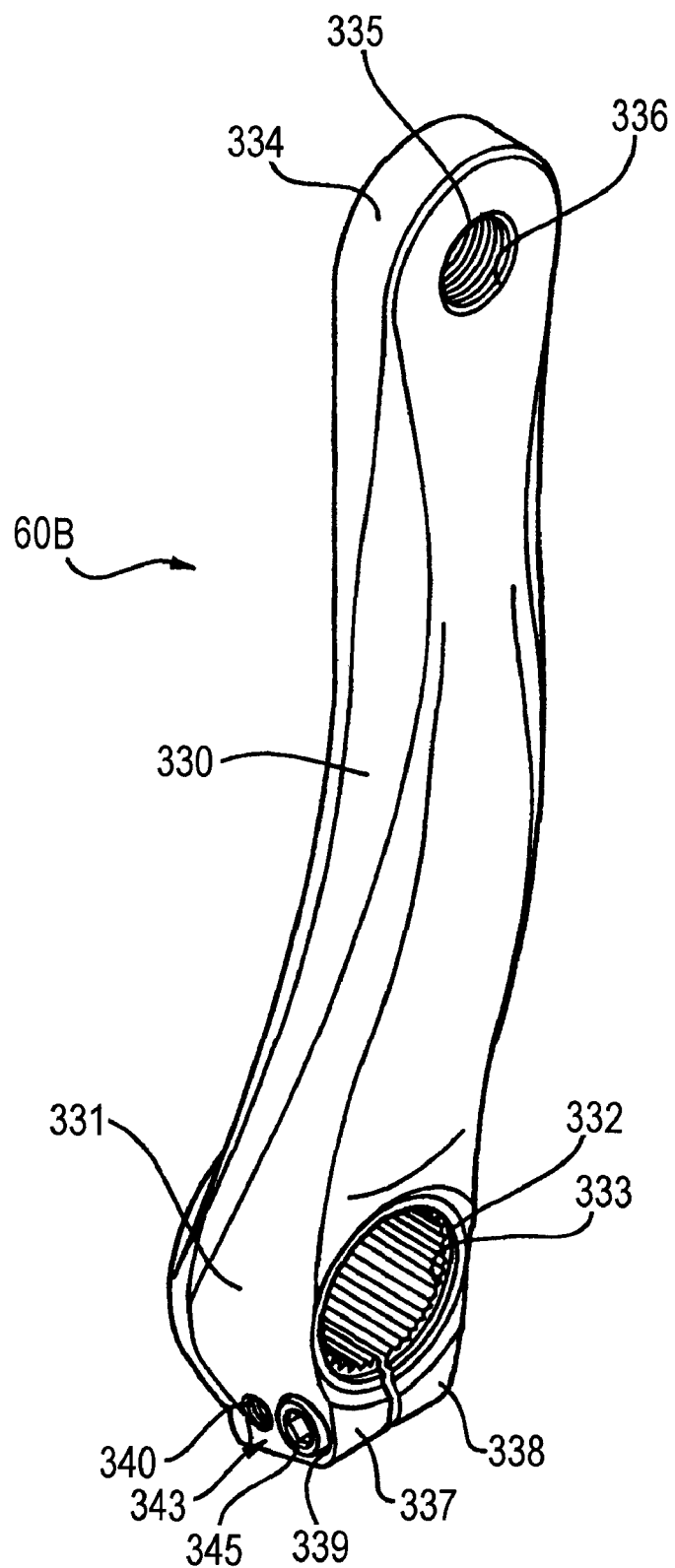
FIG. 6 is an oblique view of a particular embodiment of a left side crank arm according to the present invention.
Figure 7:
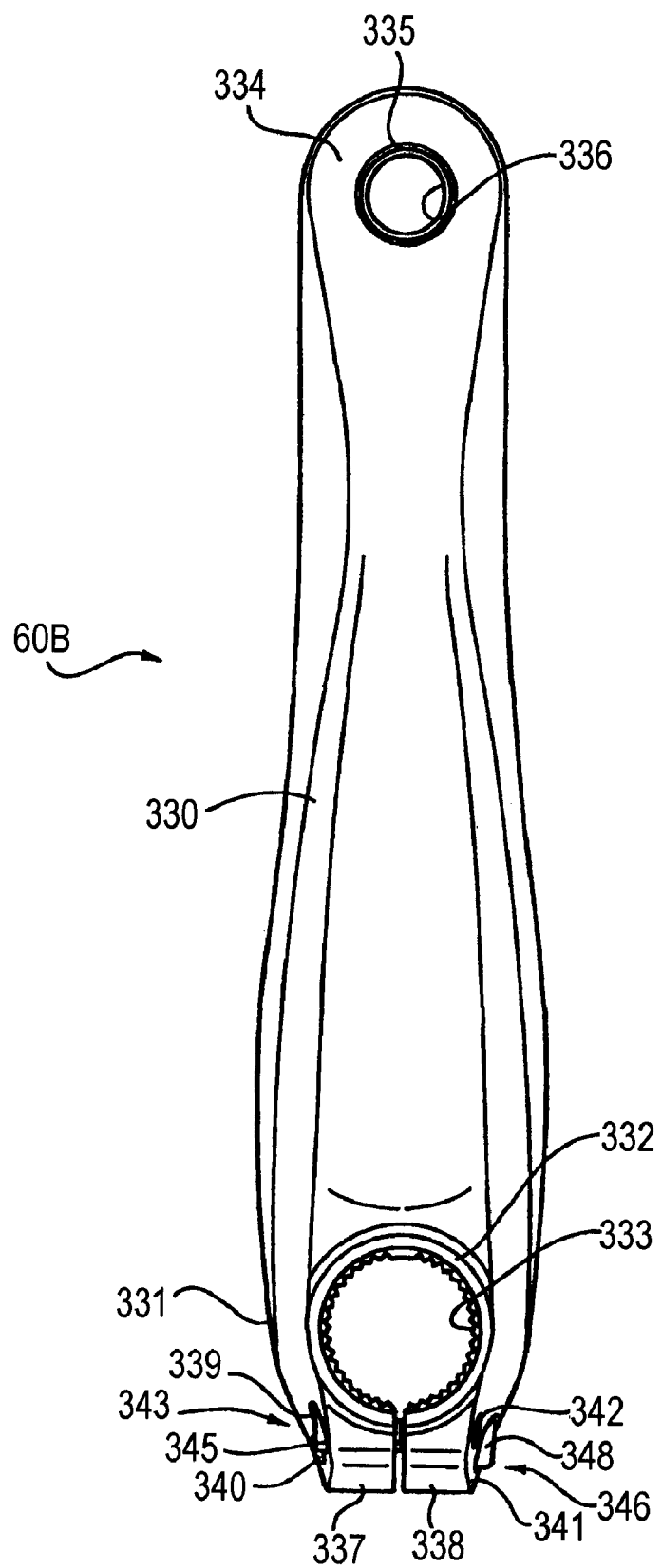
FIG. 7 is an outer view of the crank arm shown in FIG. 6.

As shown in FIGS. 6 and 7, left side crank arm 60B comprises a crank arm body 330, an axle mounting boss 331 having an axle mounting opening 332 with a splined inner peripheral surface 333, and a pedal mounting boss 334 having a pedal mounting opening 335 with a threaded inner peripheral surface 336. In this embodiment, axle mounting boss 331 includes a first mounting ear 337 spaced apart from but in close proximity to a second mounting ear 338. First mounting ear 337 includes an unthreaded fastener opening 339 and a threaded fastener opening 340, and second mounting ear 338 includes an unthreaded fastener opening 341 and a threaded fastener opening 342. A crank arm bolt 343 having a threaded shank (not shown) and a head 345 extends through unthreaded fastener opening 339 in first mounting ear 337 and screws into threaded opening 342 in second mounting ear 338 such that head 345 abuts against first mounting ear 337. Similarly, a crank arm bolt 346 having a threaded shank (not shown) and a head 348 extends through unthreaded fastener opening 341 in second mounting ear 338 and screws into threaded opening 340 in first mounting ear 337 such that head 348 abuts against second mounting ear 338. Crank arm bolts 343 and 346 thus tighten first mounting ear 337 and second mounting ear 338 towards each other for clamping axle mounting boss 331 around axle 59 as discussed below.

Axle 59 has an axle body 348 including a first end portion 350 and a second end portion 354. First end portion 350 has a plurality of circumferentially disposed splines 358 that protrude radially outwardly relative to an outer peripheral surface 362 of axle body 348 for engaging the splined inner peripheral surface 312 of axle mounting boss 308 of crank arm 60A as shown in FIG. 2. A radially outwardly extending projection in the form of a flange 366 is disposed at the extreme end of end portion 350 for abutting against the laterally outer surface of axle mounting boss 308 of crank arm 60A. Second end portion 354 of axle 59 has a threaded inner peripheral surface 368 (FIG. 2) and a plurality of circumferentially disposed splines 370 for engaging the splined inner peripheral surface 333 of axle mounting boss 331 of crank arm 60B. In this embodiment, splines 370 do not extend radially outwardly relative to the outer peripheral surface 362 of axle body 348. Instead, in this embodiment, splines 370 are flush with the outer peripheral surface of 362 of axle body 348. In other embodiments, splines 370 may be disposed radially inwardly of outer peripheral surface 362, some splines 370 may be flush with outer peripheral surface 362 of axle body 348 while other splines are disposed radially inwardly of outer peripheral surface 362, and many other configurations. Second end portion 354 and axle body 348 thus are capable of freely passing through opening 308 in crank axle mounting boss 304 of crank arm 60A and though dust tube 104 and adapter assemblies 124A and 124B so that second end portion 354 of axle 59 extends into opening 332 in crank axle mounting boss 331 of crank arm 60B and flange 366 abuts against mounting boss 304 of crank arm 60A.

An axle bolt 380 screws into threaded inner peripheral surface 368 of second end portion 354 of axle 59. As shown in FIGS. 2, 3, 8 and 9, axle bolt 380 comprises a bolt body 384 having a threaded outer peripheral surface 388 and an inner peripheral surface 392 defining an opening 396. A plurality of (e.g., eight) splines 400 are circumferentially disposed on the inner peripheral surface 392 of an end 402 of bolt body 384, and a flange 404 with a knurled outer peripheral surface 408 extends radially outwardly from end 402 of bolt body 384. In this embodiment, each spline 400 comprises an arcuate projection 412 adjacent to a groove 416.

Figure 8:
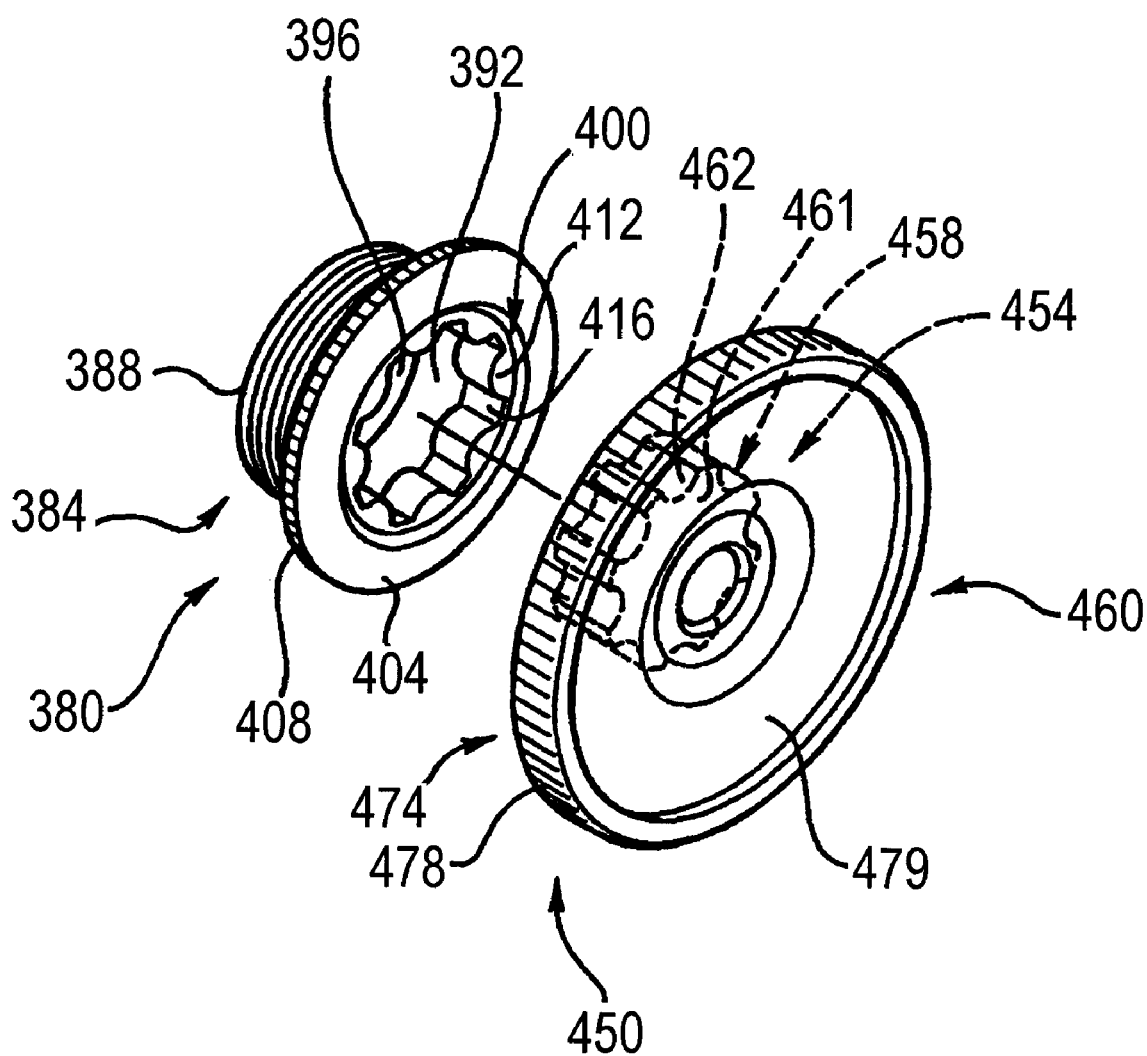
FIG. 8 is an oblique view of particular embodiments of an axle bolt and a tool for mounting the axle bolt to the axle.
Figure 9:
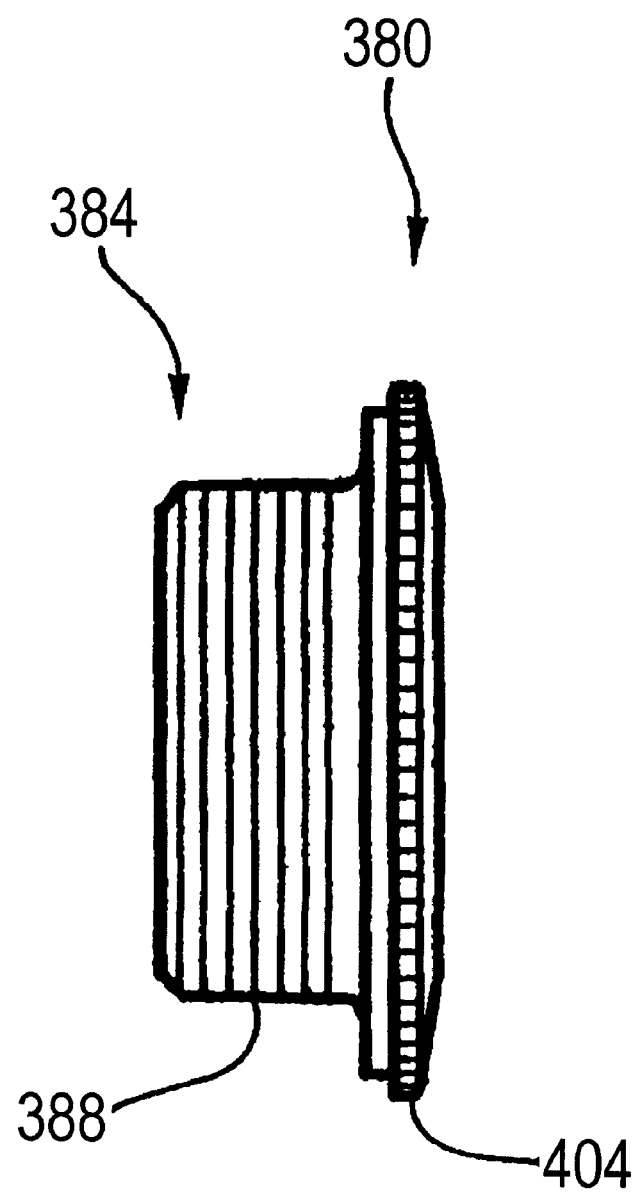
FIG. 9 is a side view of the axle bolt shown in FIG. 8.
Figure 10:
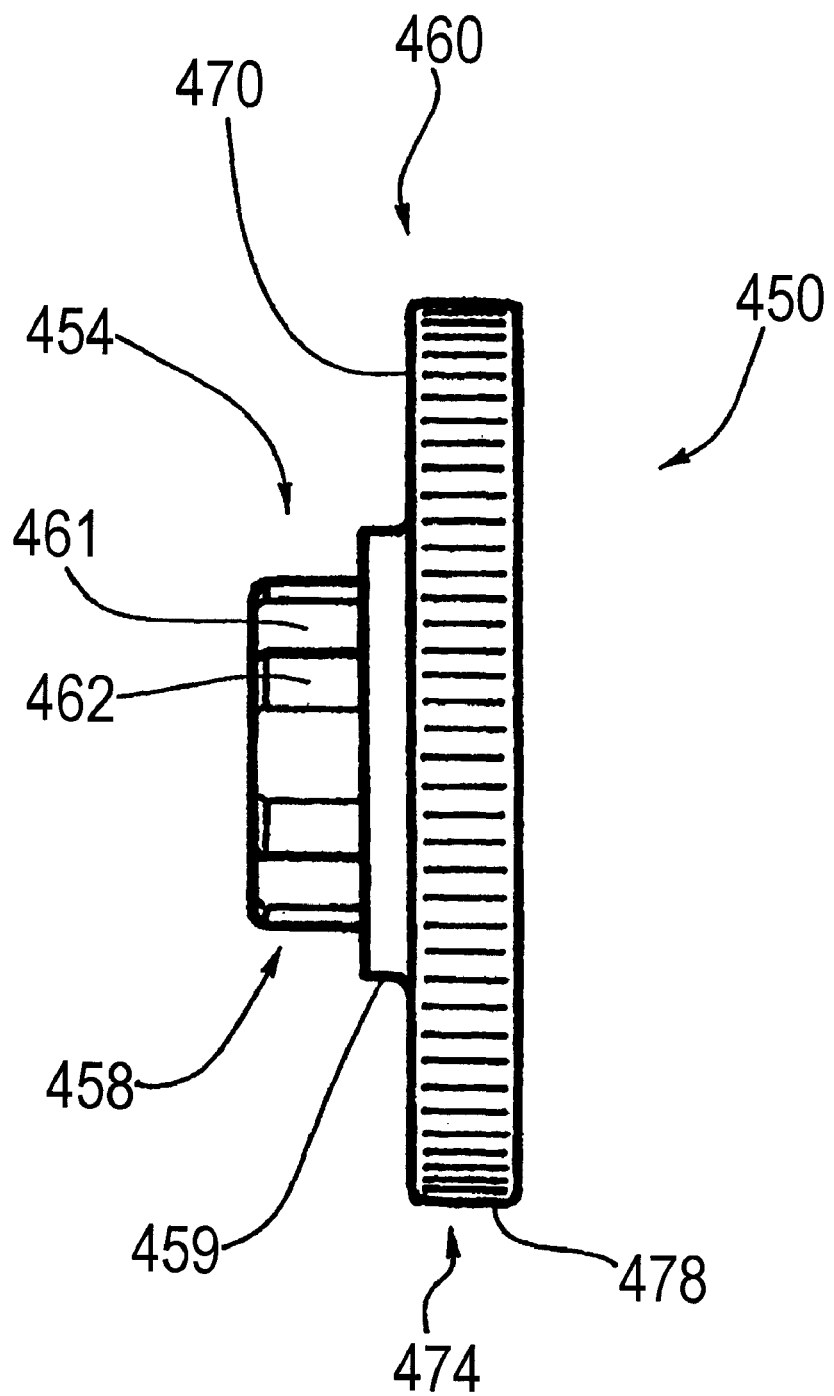
FIG. 10 is a side view of the tool shown in FIG. 8.

A tool 450 shown in FIGS. 8 and 10 is provided for screwing axle bolt 380 into threaded inner peripheral surface 368 of second end portion 354 of axle 59. Tool 450 comprises a tool body 454 and a tool operating member 460. Tool body 454 comprises a splined portion 458 and a stepped portion 459 disposed between splined portion 458 and tool operating member 460, wherein stepped portion 459 extends radially outwardly from splined portion 458. Splined portion 458 comprises a plurality of (e.g., eight) circumferentially disposed splines, each comprising a radially outwardly extending spline projection 461 adjacent to a spline groove 462. Tool operating member 460 extends radially outwardly from stepped portion 459 of tool body 454. In this embodiment, tool operating member 460 has a disk shape, and tool body 454 extends from a side surface 470 of tool operating member 460. A gripping rim 474 having a knurled outer peripheral surface 478 is disposed at a radially outermost portion of tool operating member 460 such that gripping rim 474 extends laterally from a side surface 479 of tool operating member 460.

To assemble axle 59 to bottom bracket 33, dust tube 104, O-ring seals 116 and 120 and adapter assemblies 124A and 124B are mounted to bottom bracket 33. Axle 59 is passed through opening 308 in crank axle mounting boss 304 of crank arm 60A and though adapter assemblies 124A and 124B and dust tube 104 so that second end portion 354 of axle 59 extends into opening 332 in crank axle mounting boss 331 of crank arm 60B and flange 366 abuts against crank axle mounting boss 304 of crank arm 60A. Axle bolt 380 then is screwed into the threaded inner peripheral surface 368 of axle 59 using tool 450 by engaging splined portion 458 of tool 450 with splines 400 of axle bolt 380 and by gripping and turning gripping rim 474 until the desired amount of play exists between crank arms 60A and 60B and spacers 154A and 154B. Thereafter, bolts 343 and 346 are tightened while axle mounting boss 331 of crank arm 60B abuts against flange 404 of axle bolt 380 to set the final position of crank arm 60B and thereby the play between crank arms 60A and 60B and spacers 154A and 154B.

While the above is a description of various embodiments of inventive features, further modifications may be employed without departing from the spirit and scope of the present invention. For example, while projection 366 was formed as one piece with axle body 348 in the above embodiment, many other configurations are possible. FIGS. 11 and 12 are detailed views of an alternative embodiment of components located at a first end portion 350A of a crank axle 59A. In this embodiment, a separate projecting member 500 is mounted to first end portion 350A so as to abut against a laterally outer surface of a crank arm 60A' to prevent crank arm 60A' from moving axially outward. More specifically, first end portion 350A includes a groove 504 that extends in a circumferential direction around first end portion 350A. In this embodiment, groove 504 extends completely around first end portion 350A and is located directly adjacent to first splines 358. Thus, projecting member 500 may have the form of a C-clip that first within groove 504 as shown in FIG. 12. As shown in FIG. 11, axle mounting opening 308A of crank arm 60A' preferably is configured to have a stepped inner peripheral surface 312A so that first end portion 350A and projecting member 500 are positioned within axle mounting opening 308A. Alternatively, axle mounting opening 308A of crank arm 60A' may be configured to have a non-stepped inner peripheral surface 312A. In that case, projecting member 500 will be positioned axially outwardly from axle mounting opening 308A of crank arm 60A'.

FIGS. 13 and 14 are detailed views of another alternative embodiment of components located at a first end portion 350B of a crank axle 59B. In this embodiment, a separate projecting member 510 is mounted to first end portion 350B so as to abut against a laterally outer surface of a crank arm 60A" to prevent crank arm 60A from moving axially outward. More specifically, in this embodiment, first end portion 350B includes diametrically opposed openings 514A and 514B (FIG. 14) that extend through opposed wall portions 348A and 348B of axle body 348. Thus, projecting member 510 may have the form of a pin that extends through both openings 514A and 514B. In some embodiments, a pin may extend through only one of the openings 514A or 514B. As shown in FIG. 13, axle mounting opening 308B of crank arm 60A" preferably is configured to have a stepped inner peripheral surface 312B so that first end portion 350B and projecting member 510 are positioned within axle mounting opening 308B. Pin 510 may be press-fit or loosely fitted into openings 514A and/or 514B. Alternatively, axle mounting opening 308B of crank arm 60A" may be configured to have a non-stepped inner peripheral surface 312B. In that case, pin 510 will be positioned axially outwardly from axle mounting opening 308B of crank arm 60A and typically will be press-fit into openings 514A and/or 514B.

Of course, in some embodiments, a separate projecting member may be attached to first end portion 350 by an adhesive, by brazing, or by some other method. Alternatively, one or more projections of a selected shape and/or size may be formed as one piece with first end portion 350 or attached using various methods. The splines need not be evenly spaced relative to each other. The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle crank axle adapted to be rotatably supported within a bottom bracket of a bicycle frame for supporting a bicycle crank arm, wherein the crank axle comprises:
   an axle body having first and second end portions;
   a plurality of first splines disposed at the first end portion of the axle body;
   a plurality of second splines disposed at the second end portion of the axle body; and
   a projection extending radially outwardly from the first end portion of the axle body, wherein the projection is structured to abut against a lateral outer surface of the bicycle crank arm to prevent the bicycle crank arm from moving axially outward;
   wherein a separate projecting member is mounted to the first end of the axle body to form the projection;
   wherein the plurality of first splines extend radially outwardly from an outer peripheral surface of the axle body for engaging a splined surface of the bicycle crank arm; and
   wherein the plurality of second splines do not extend radially outwardly relative to the outer peripheral surface of the axle body.

2. The crank axle according to claim 1 wherein the plurality of first splines are disposed axially inwardly of the projection.

3. The crank axle according to claim 2 wherein the plurality of first splines are located in close proximity to the projection.

4. The crank axle according to claim 3 wherein the plurality of first splines are located directly adjacent to the projection.

5. The crank axle according to claim 1 wherein the second end portion of the axle body includes a threaded opening.

6. The crank axle according to claim 1 wherein the plurality of second splines do not extend radially outwardly from an outer peripheral surface of the axle body located axially inwardly of the plurality of second splines.

7. The crank axle according to claim 1 wherein the projection extends circumferentially along the axle body.

8. The crank axle according to claim 1 wherein the first end portion of the axle body includes a groove, and wherein the projecting member is disposed in the groove.

9. The crank axle according to claim 8 wherein the projecting member comprises a C-clip.

10. The crank axle according to claim 1 wherein the projecting member comprises a pin.

11. The crank axle according to claim 10 wherein the first end portion of the axle body has an opening formed therein, and wherein the pin is disposed in the opening.

12. The crank axle according to claim 11 wherein the opening extends diametrically through the first end portion, and wherein the pin extends through the opening to form first and second radially projecting abutments.

* * * * *